United States Patent
Bi et al.

(10) Patent No.: US 8,120,868 B2
(45) Date of Patent: Feb. 21, 2012

(54) DATA STORAGE MEDIUM HAVING SYSTEM DATA STORED IN A GUARD BAND BETWEEN ZONES OF CONSECUTIVE DATA STORAGE TRACKS

(75) Inventors: Qiang Bi, Singapore (SG); KianKeong Ooi, Singapore (SG); TaiVie Chiang, Singapore (SG); WingKong Chiang, Singapore (SG); Edmun ChianSong Seng, Singapore (SG); Jimmy Pang, Singapore (SG); BengWee Quak, Singapore (SG); UttHeng Kan, Singapore (SG); Xiong Liu, Singapore (SG); Ricardo SoonLian Lim, Singapore (SG); Patrick TaiHeng, Singapore (SG); MingZhong Dong, Singapore (SG); WeiMing Yeow, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/181,295

(22) Filed: Jul. 28, 2008

(65) Prior Publication Data

US 2008/0304172 A1      Dec. 11, 2008

Related U.S. Application Data

(63) Continuation of application No. 11/231,960, filed on Sep. 21, 2005, now Pat. No. 7,405,893.

(51) Int. Cl.
*G11B 5/09* (2006.01)
*G11B 5/596* (2006.01)

(52) U.S. Cl. ......................................... 360/48

(58) Field of Classification Search ................ None
See application file for complete search history.

(56) References Cited

U.S. PATENT DOCUMENTS

| | | | |
|---|---|---|---|
| 4,669,003 A | 5/1987 | Bell et al. | |
| 4,799,112 A | 1/1989 | Bremmer et al. | |
| 5,185,681 A | 2/1993 | Volz et al. | |
| 5,903,411 A | 5/1999 | Tomita et al. | |
| 6,178,056 B1 * | 1/2001 | Cloke et al. | 360/46 |
| 6,185,063 B1 | 2/2001 | Cameron | |
| 6,262,857 B1 | 7/2001 | Hull | |
| 6,266,203 B1 | 7/2001 | Street | |
| 6,674,604 B1 | 1/2004 | Teng et al. | |
| 6,731,444 B2 | 5/2004 | Teng et al. | |
| 6,754,032 B1 | 6/2004 | Szita et al. | |
| 6,788,489 B1 | 9/2004 | Chang et al. | |
| 6,873,488 B2 | 3/2005 | Teo | |
| 7,065,605 B2 | 6/2006 | Yeow et al. | |
| 7,082,007 B2 * | 7/2006 | Liu et al. | 360/77.02 |
| 7,133,228 B2 | 11/2006 | Fung et al. | |
| 7,401,174 B2 * | 7/2008 | So et al. | 711/4 |
| 7,405,893 B2 | 7/2008 | Bi et al. | |
| 2004/0044939 A1 | 3/2004 | Lea et al. | |
| 2004/0268034 A1 | 12/2004 | Lim et al. | |

OTHER PUBLICATIONS

Ashar, Kanu G., Magnetic Disk Drive Technology, 1997, IEEE Press, p. 214.*

* cited by examiner

*Primary Examiner* — Daniell L Negron
(74) *Attorney, Agent, or Firm* — Mitchell K. McCarthy

(57) ABSTRACT

A storage medium format is provided having a first band of a plurality of consecutive data storage tracks having user data stored thereto, a second band of a plurality of consecutive data storage tracks having other user data stored thereto, and a guard track medially disposed therebetween the first band and the second band and having system data stored thereto.

23 Claims, 11 Drawing Sheets

DATA STORAGE MEDIUM HAVING SYSTEM DATA STORED IN A GUARD BAND BETWEEN ZONES OF CONSECUTIVE DATA STORAGE TRACKS

RELATED APPLICATIONS

This application is a continuation-in-part of U.S. application Ser. No. 11/231,960 filed Sep. 21, 2005.

BACKGROUND

Data storage devices have tended to be made ever smaller, yet with ever greater storage capacity, as technology has been advanced. Many applications require "micro" data storage devices that are one inch or smaller in diameter, and a fraction of an ounce in weight, for example. Applications for which micro data storage devices are well suited include hand-held or otherwise easily portable devices, such as digital music players, PDAs, digital still cameras and video cameras, and external computer memory, for example. Adapting data storage technology with optimum performance in current applications poses considerable technical challenges.

Embodiments of the present invention provide unforeseen advantages over conventional data storage systems, and provide superior performance characteristics.

SUMMARY

Claimed embodiments are generally directed to servo formatting a storage medium.

In some embodiments a storage medium is provided having a first band of a plurality of consecutive data storage tracks having user data sectors stored thereto, a second band of a plurality of consecutive data storage tracks having other user data sectors stored thereto, and a guard track medially disposed therebetween the first band and the second band and having system sectors stored thereto.

In some embodiments a method is provided for processing data, including the step of retrieving system sectors from an annular guard band of one or more storage tracks that are interposed between and consecutive with a first band of a plurality of consecutive data storage tracks, having user data sectors stored thereto, and a second band of a plurality of consecutive data storage tracks, having user data sectors stored thereto.

In some embodiments a data storage device is provided having a storage medium that contains a plurality of different storage locations for storing user data. The storage locations include a minimum storage location and a maximum storage location that define extremities of a user data storage space continuum. The data storage device further has a means for optimizing a utilization of the storage medium by storing system sectors to storage locations within the user data storage space continuum.

DETAILED DESCRIPTION

Figure 1:
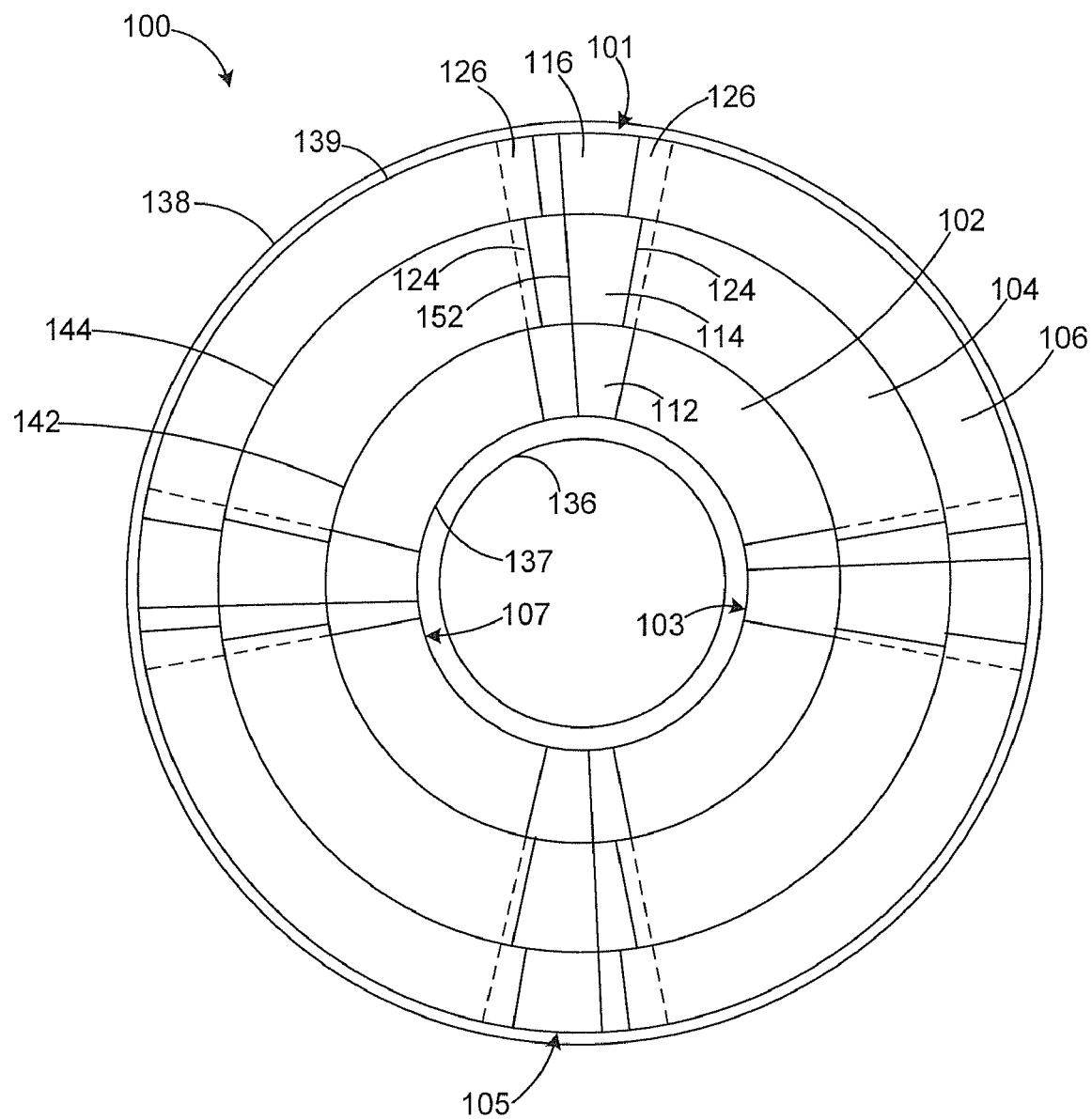
FIG. 1 is a plan view of a data storage medium with optimized servo format, according to illustrative embodiments.

FIG. 1 is a plan view of a data storage medium 100 with an optimized servo format according to some illustrative embodiments. Medium 100 includes many inventive elements that provide substantial advantages in performance, as detailed with respect to FIG. 1 and the remaining figures. For example, medium 100 provides advantageous performance by various inventive elements for optimizing its servo fields, such as servo bits written at higher frequency corresponding to greater radius, which provides reduced servo overhead and an increased proportion of data storage medium 100 devoted to storing data, for example. The servo fields occupy area on the medium 100 that is thereby removed from availability for user data, although the servo fields are advantageous in providing an associated read/write head with the information it needs to navigate the data tracks written to medium 100. Some of the inventive elements of embodiments disclosed herein maximize the servo performance of the servo fields while minimizing the area of medium 100 that the servo fields take up. Various inventive elements are described in detail as follows below.

In particular, medium 100 includes different annular zones, such as the three zones 102, 104, and 106 disposed generally concentrically on medium 100, in the particular embodiment of FIG. 1. Medium 100 has an inner edge 136 and an outer edge 138. The extremity of the user data storage space can be defined by the medium 100 as bounded by an inner extremity at an innermost user data storage track 137 and an outer extremity at an outermost user data storage track 139. Zone 102 is adjacent inner boundary 136 and includes the inner extremity 137, and may be considered the inner zone. Zone 106 is adjacent outer boundary 138 and includes the outer extremity 139, and may be considered the outer zone, in these illustrative embodiments. With respect to the intermediate zone 104, therefore, the inner zone 102 is a next inward zone from zone 104, and the outer zone 106 is a next outward zone from zone 104. A first annular guard band 142 is disposed between inner zone 102 and zone 104 and thereby nested between inner zone 102 and zone 104, and a second annular guard band 144 is disposed between zone 104 and outer zone 106 and thereby nested between zone 104 and outer zone 106.

Zones 102, 104 & 106 are transected by a number of servo sectors, each composed of a series of servo fields, as illustratively and exaggeratedly depicted generally along illustrative servo fields 112, 114, 116 of servo sector 101, and along other, similar servo sectors 103, 105, 107 disposed around medium 100. Each of servo fields 112, 114, 116 radially spans one of zones 102, 104 & 106, with servo field 112 spanning zone 102, servo field 114 spanning zone 104, and servo field 116 spanning zone 106, in these illustrative embodiments. By radially spanning the zones, each of servo fields 112, 114, 116 extends from a radially inward position in its respective zone, to a radially outward position in its respective zone. The actual servo sectors would be much smaller and narrower, and more plentiful, than in the depiction of FIG. 1, which has been exaggerated for clarity. Address marks extend radially from the inner diameter to the outer diameter within the servo zones, such as illustrative address mark 152 within servo sector 101. Illustrative servo fields 112, 114, 116 include servo field bits written on medium 100. The gaps 124, 126 adjacent servo fields 114, 116 are described below. The servo field bits may be written onto medium 100 during manufacture, with a specialized external write head, in illustrative embodiments. The servo fields may also be written in situ, in other illustrative embodiments.

Writing the servo bits to medium 100 involves rotating medium 100 while the write head writes one bit after another, in a selected frequency with which it writes new bits, with the inverse of the frequency being the period of time spent in writing each bit, in these illustrative embodiments. The servo frequency is typically less than the user data read/write frequency, in these illustrative embodiments. The servo bits thereby written to medium 100 each occupy a given arc length determined by the period expended writing the bit, times the rotation rate of the medium during the write, times the radial displacement of the position where the bit is written to the medium from the center of rotation of the medium. Therefore, if the same frequency is used for writing bits at different displacements from the center of rotation, a bit written at a greater radial displacement will also have a greater arc length than a bit written at a lesser radial displacement, in these illustrative embodiments.

In conventional devices, the frequency is set so that, during normal operation, a read/write head is able to read the bits with the shortest arc length, i.e. those at the smallest radial displacement from the center of rotation, adjacent the inner diameter of a medium, with a specified level of assured read performance. This means bits at greater radial displacement from the center of rotation occupy a greater arc length than is needed to be read by the read/write head with the same level of assurance as for the bits adjacent the inner diameter. The extra arc length of all these bits away from the inner diameter reduces the area that can be reclaimed from servo overhead and devoted instead to useful data storage, and so can be considered wasted space, if a way can be found to reclaim this space without degrading other performance aspects. By reclaiming back the servo overhead area, the reclaimed real estate (1) can be used to store more user data and/or (2) enables a reduced data frequency which benefits a lower bit error rate and a better signal to noise ratio (SNR) in reading data. In some illustrative embodiments, the data SNR was improved by 0.4 dB.

In some illustrative embodiments, this extra space is reclaimed for user data storage by dividing the medium into separate zones, and writing the servo field bits in a higher frequency for zones away from the inner diameter, such that the farther a zone is from the inner diameter, the higher the frequency is with which the servo field bits are written in that zone. In the specific illustrative embodiments of FIG. 1, medium 100 includes the three zones 102, 104, 106, and the servo field bits are written in a first frequency in zone 102, in a second frequency in zone 106 that is higher than the frequency of zone 102, and a third frequency in zone 104 that is higher than the frequency in zone 102 and lower than the frequency in zone 106. Zones 102, 104, and 106 may thereby be referred to as differential frequency zones. Because the servo field bits in zones 104 and 106 are written at progressively higher frequencies, they also occupy correspondingly shorter arc lengths than they would have at the single frequency, thereby reducing servo overhead and leaving a greater proportion of the medium available for storing user data. This is demonstrated with the gaps 124 and 126 adjacent to servo fields 114 and 116 respectively. The dotted lines show what the boundaries of these two servo fields would be if the entire medium 100 was written with the frequency with which servo field 112 was written. Gaps 124 and 126 are therefore areas that would have gone to servo field use but instead are freed up for user data storage use, thanks to the use of multiple frequencies in writing the servo bits of medium 100.

As can be seen in FIG. 1, each of the servo fields 112, 114, 116 takes the form of a semi-annular section. Rather than the single semi-annular section for a given servo field that would prevail without dividing the medium 100 into different frequency zones, each servo sector includes a radial row of semi-annular sections constituting separate servo fields, such that the inward semi-annular section 112 has the largest angular spread of servo fields in its servo sector, and each of the other servo fields has an angular spread that is lesser than that of the inwardly adjacent semi-annular section, in some illustrative embodiments. That is, servo field 112 is the inwardly adjacent servo field to servo field 114, and servo field 114 is inwardly adjacent to servo field 116. Correspondingly, servo field 114 has a lesser angular spread than servo field 112, and servo field 116 has a lesser angular spread than servo field 114. The servo field bits within each of the servo fields 112, 114, 116 each have an angular spread that is proportional to the angular spread of the servo field within which it is disposed, and an arc length that is the angular spread times the radial displacement from the center of medium 100 at a given position of each respective servo bit, in some illustrative embodiments. Therefore, the servo bits within one of the servo fields have arc lengths that steadily increase proportionately with increasing radius; but going from one servo field to an outwardly adjacent servo field within a servo sector, the arc lengths of the lowest-radius servo bits in the outwardly adjacent servo fields are significantly lesser than the arc lengths of the highest-radius servo bits in the inwardly adjacent servo field. Once again, the arc lengths of these servo bits steadily increases with increasing radius. Thus, the servo field bits in the inwardly adjacent zone have a first range of arc lengths, and the servo field bits in the outwardly adjacent zone have a second range of arc lengths that substantially overlaps the first range of arc lengths. This provides for reduced area devoted to servo function, or servo overhead, for the intermediate and outer zones 104 and 106 relative to inner zone 102, and relative to what would be required for the entire medium in the absence of differential frequency zoning, for these illustrative embodiments.

The following table presents an illustrative example of the servo overhead reduction, comparing a conventional system with a constant servo frequency of 14 MHz and a constant servo overhead of 8.13%, with an example of an illustrative embodiment, using the same specifications as the conventional system for its inner zone:

| Zone | Conventional System | | System According to Illustrative Embodiment | | |
| --- | --- | --- | --- | --- | --- |
| | Servo Frequency (MHz) | Servo Overhead (%) | Servo Frequency (MHz) | Servo Overhead (%) | Reduction (%) |
| Inner | 14 | 8.13 | 14 | 8.13 | 0 |
| Intermediate | 14 | 8.13 | 17.5 | 6.52 | 1.61 |
| Outer | 14 | 8.13 | 21 | 5.42 | 2.71 |

In the illustrative embodiments, the intermediate zone, corresponding to zone 104, is written with a frequency of 17.5 MHz, which reduces the size of the servo fields enough to reduce servo overhead to 6.52% in the intermediate zone, so that 1.61% of the medium that would have been devoted to servo bits is instead available for user data storage; and the outer zone, corresponding to zone 106, is written with a frequency of 21 MHz, which reduces the size of the servo fields enough to reduce servo overhead to 5.42% in the outer zone, so that 2.71% of the outer medium that would have been devoted to servo bits is instead available for user data storage. Because the outer zone contains far more area than the inner zone and more area than the intermediate zone, the overall servo overhead reduction is greater than the figure for the intermediate zone and not much less than that for the outer zone, in this illustrative embodiment. Other embodiments use only two zones, or four or more zones, each with its own servo frequency.

In some illustrative embodiments, as the diameter of the medium 100 becomes smaller, the proportion of area reclaimed from servo overhead for user data storage becomes greater. Therefore, this inventive system using differential frequency zones is especially advantageous for very small data storage media and data storage devices, according to these illustrative embodiments. For example, some illustrative embodiments corresponding to the depiction of medium 100 measures approximately one inch across. Other illustrative embodiments corresponding to the depiction of medium 100 occupy a range of diameters less than one inch. Still other illustrative embodiments have larger diameters such as 2.5 inches or 3.5 inches, or other values, while corresponding to scale with medium 100 as depicted in FIG. 1. Different embodiments otherwise analogous to medium 100 also include a wide variety of different numbers of zones, and a wide variety of different numbers of servo sectors.

One significant issue concomitant with the differential frequency zones, such as zones 102, 104, 106 in the illustrative embodiments of FIG. 1, concerns their characteristics near the boundaries between each adjacent set of zones 102, 104, 106. This issue is inventively and advantageously addressed by first guard band 142 and second guard band 144, disposed between zones 102 and 104, and between zones 104 and 106, respectively. The details of such guard bands, in a variety of inventive and advantageous embodiments, are described below, with reference to several of the figures.

Figure 2:
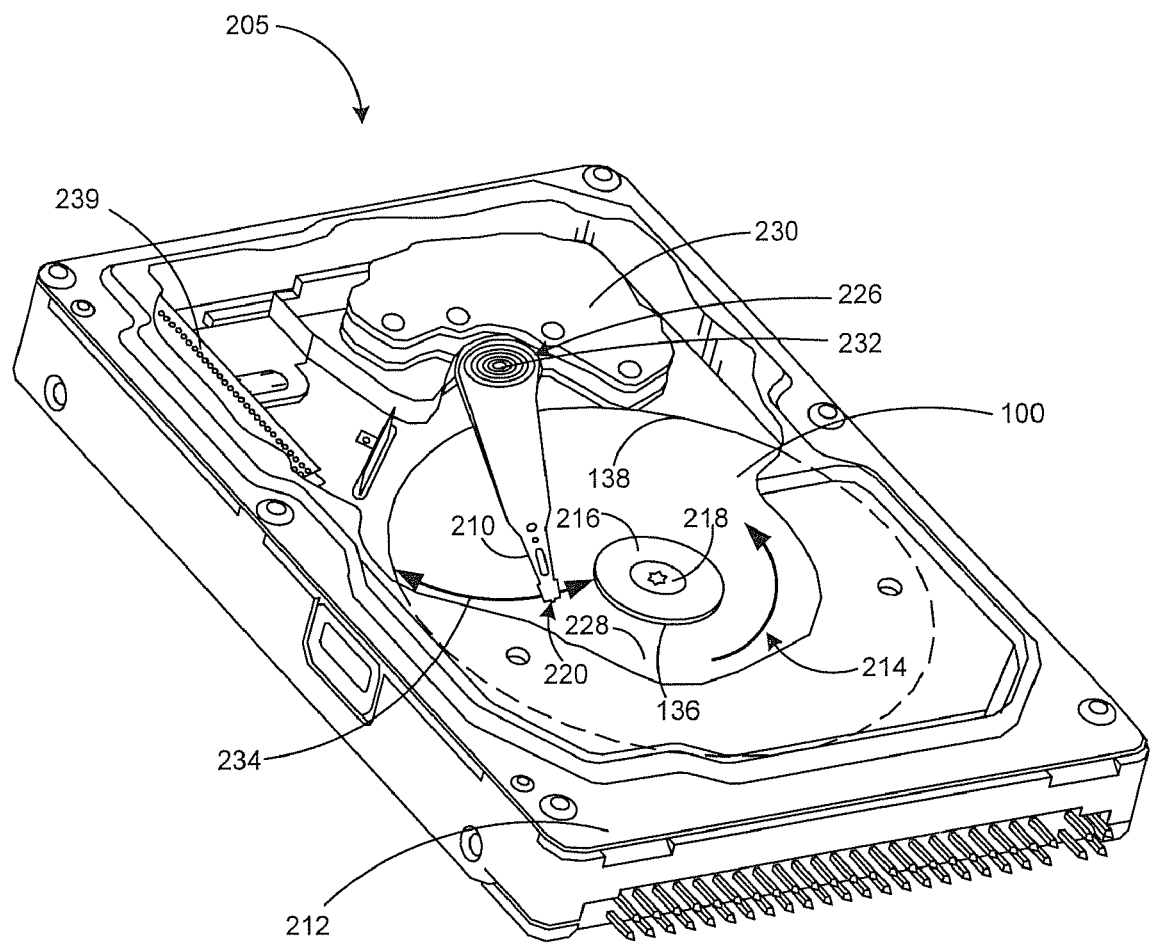
FIG. 2 is a perspective view of a data storage system that may incorporate a data storage medium with optimized servo format, according to illustrative embodiments.

FIG. 2 depicts data storage system 205 which illustratively embodies the claimed invention, and shows an illustrative context within which the illustrative embodiments of medium 100 may be used. FIG. 2 depicts an exploded, perspective view of a data storage system 205, illustratively embodied as a disc drive in these embodiments, which includes medium 100 with optimized servo format, according to illustrative embodiments.

Disc drive 205 is one example from a variety of data storage systems to which various embodiments are applicable. Disc drive 205 includes a housing with a deck 212 and a top cover (not shown). Disc drive 205 also includes a disc pack 214 comprising a plurality of mediums 100. Disc pack 214 is rotatably mounted on a spindle motor (not shown) by a disc clamp 216. Disc pack 214 includes a plurality of individual mediums 100 which are mounted for co-rotation about central axis 218. Each medium surface 228 is associated with a slider which is mounted to disc drive 205 and carries a data interface head ("read/write head") 220, with read and/or write function for communication with the respective medium 100, in these illustrative embodiments.

In FIG. 2, the read/write head 220 is supported by suspension 210 which is rotatably mounted on deck 212. More particularly, suspension 210 is rotatably mounted on actuator 226, included on deck 212, and is thereby disposed on deck 212 in a controllably moveable way. Suspension 210 supplies a pre-load force to the slider which is substantially normal to opposing medium surface 228. The pre-load force counteracts an aerodynamic lifting force developed between the slider and the medium surface 228 during the rotation of disc pack 214. Each medium surface 228 is likewise interfaced by a similarly disposed slider (not shown). Actuator 226 is a rotary moving coil actuator and includes a voice coil motor, shown generally at 230, in these illustrative embodiments. Voice coil motor 230 rotates actuator 226 about pivot shaft 232 to position the read/write head 220 over an intended data track (not shown) along a range 234 between the medium 100 inner diameter 136 and outer diameter 138. Voice coil motor 230 operates under control of internal circuitry 239. Other elements may occur in alternative embodiments, such as an actuator that positions the read/write head 220 through linear extension and retraction, for example.

The read/write head 220 is thereby configured to be controllably positioned proximate to the medium 100. The read/write head 220 is capable of reading data from and writing data to the medium 100, in these illustrative embodiments. The read/write heads 220 may be of any type known in the art, including magnetic, magnetoresistive (MR), giant magnetoresistive (GMR), tunneling giant MR (TGMR), spin valve (SV), optical, and so forth, in various embodiments. In different embodiments, a wide variety of numbers of mediums 100, with a corresponding number of read/write heads 220 and associated sliders may be used.

Medium 100 of disc drive 205 includes radial servo fields disposed at generally regular intervals around the medium 100, as shown in FIG. 1. Likewise, medium 100 is divided into two or more annular zones (not separately shown in FIG. 2), such as the three zones 102, 104, 106 of FIG. 1, each with a respective frequency with which the read/write head 220 is specified to operate within that zone. Each of the servo fields extends across one of the zones. The medium 100 comprises guard bands 142, 144 between each pair of adjacent zones, such that the guard bands 142, 144 are configured to optimize the capability of the read/write head 220 to remain operating at the respective frequency specified for each zone while the read/write head 220 is in that zone, and to transition to the respective frequency of a new zone from among the zones when the read/write head 220 moves to the new zone. With the servo Fields written at different frequencies in different zones, the read/write heads 220 also use different read frequencies for reading the servo fields in each of the zones.

One significant performance issue pertaining to the differential frequency zones is how to transition the read/write head 220 between zones with different servo frequencies, or how to synchronize the servo channel to the servo bursts on different zones with different burst frequencies, particularly when crossing from one of the zones to another.

Figure 3:
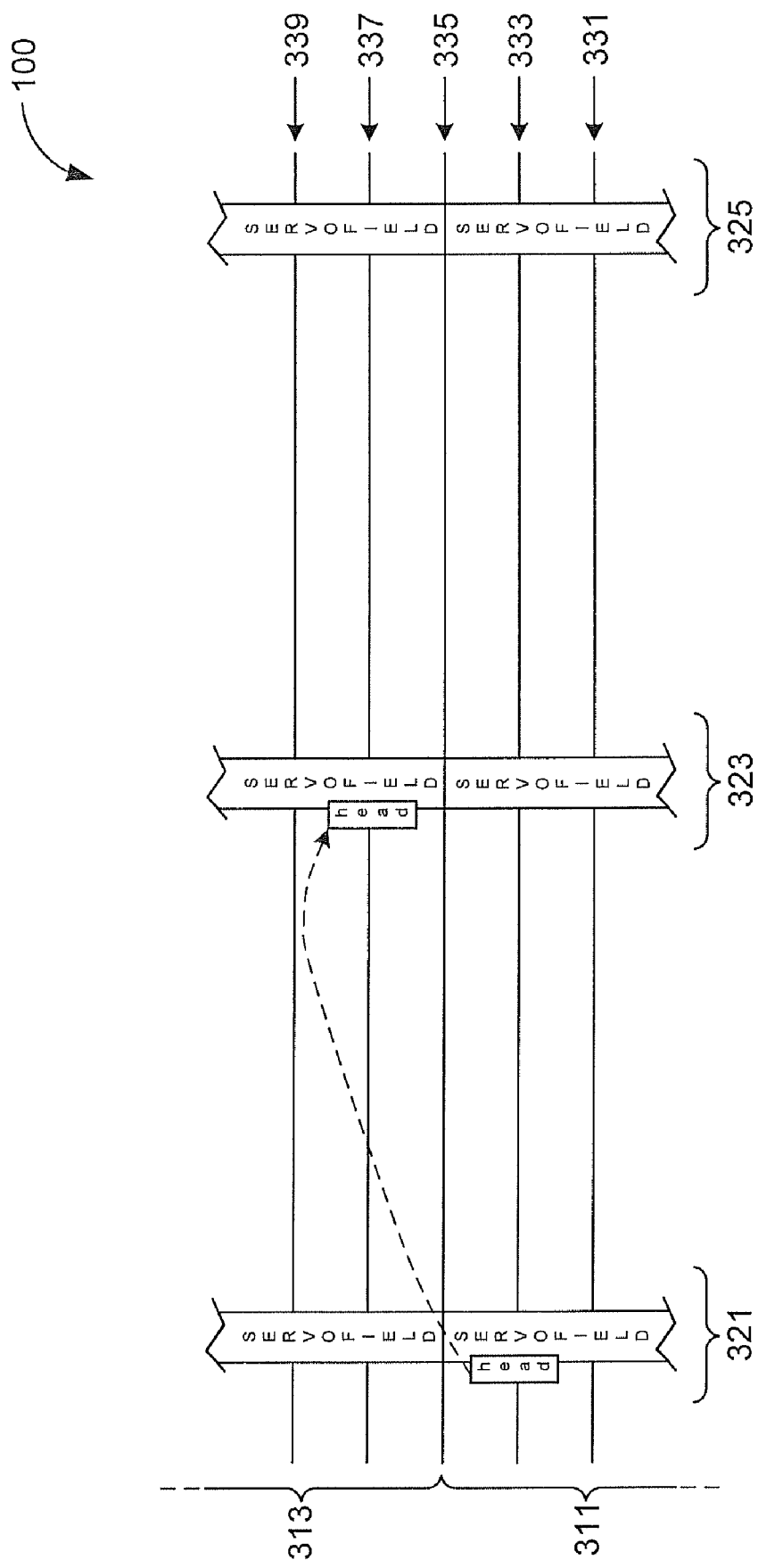
FIG. 3 is a close-up schematic of a section of a data storage medium with optimized servo format, according to illustrative embodiments.

FIG. 3 depicts a relatively simple embodiment of a zone boundary, with only a minimal, single track 335 separating the two zones 311, 313 which have different frequencies. The depiction in FIG. 3 represents a microscopic view of a portion of the medium 100. Tracks 331, 333, 335, 337 and 339 are portions of concentric tracks that circumscribe medium 100. The depicted sections of tracks 331, 333, 335, 337 and 339 are actually circle sections, but seen at such close range relative to their diameters they are difficult to distinguish from straight lines. Zone 311 is inward of zone 313, toward the center of medium 100; zone 313 is outward of zone 311, toward the perimeter of medium 100. Tracks 331, 333, 335, 337 and 339 are user data tracks, available for writing user data to and reading user data from. Track 335 is depicted as being directly on the boundary between zones 311 and 313, but is preferably written with one of the adjacent zone frequencies so that user data can be stored there as well. The features depicted in FIG. 3 are illustrative of features disposed around the wider medium 100.

Servo sectors (which can also be called servo wedges) 321, 323, and 325 lie along radial lines on medium 100, across the data tracks. Servo sectors 321, 323, and 325 include servo fields. The portions of the tracks within the servo fields contain servo information, such as position and synchronization information, which can be used by the read/write head 220 to control its position relative to representative tracks 331, 333, 335, 337 and 339, and to sync to the servo fields at the frequency with which they are written. The servo fields in zone 313 are written with a higher frequency than the frequency with which the servo fields in zone 311 are written, in these illustrative embodiments.

Read/write head 220 is depicted seeking from track 333 at servo field 321 to track 337 at servo field 323. However, in this embodiment, it may be difficult for head 220 to perform this seek successfully, and to sync to the servo bursts in zone 313 with the higher frequency of zone 313. When the head 220 is near the zone boundary at track 335, it may become likely to experience a missing address mark error, or a loss of synchronization with the new zone servo information before the re-initialization of the servo channel is complete. This would generally require a recovery algorithm to handle, and involves loss of control and predictability. Additionally, in case of a shock to the system while head 220 is near the boundary track 335, this would also increase the risk of a loss of synchronization with the servo information.

Figure 4:
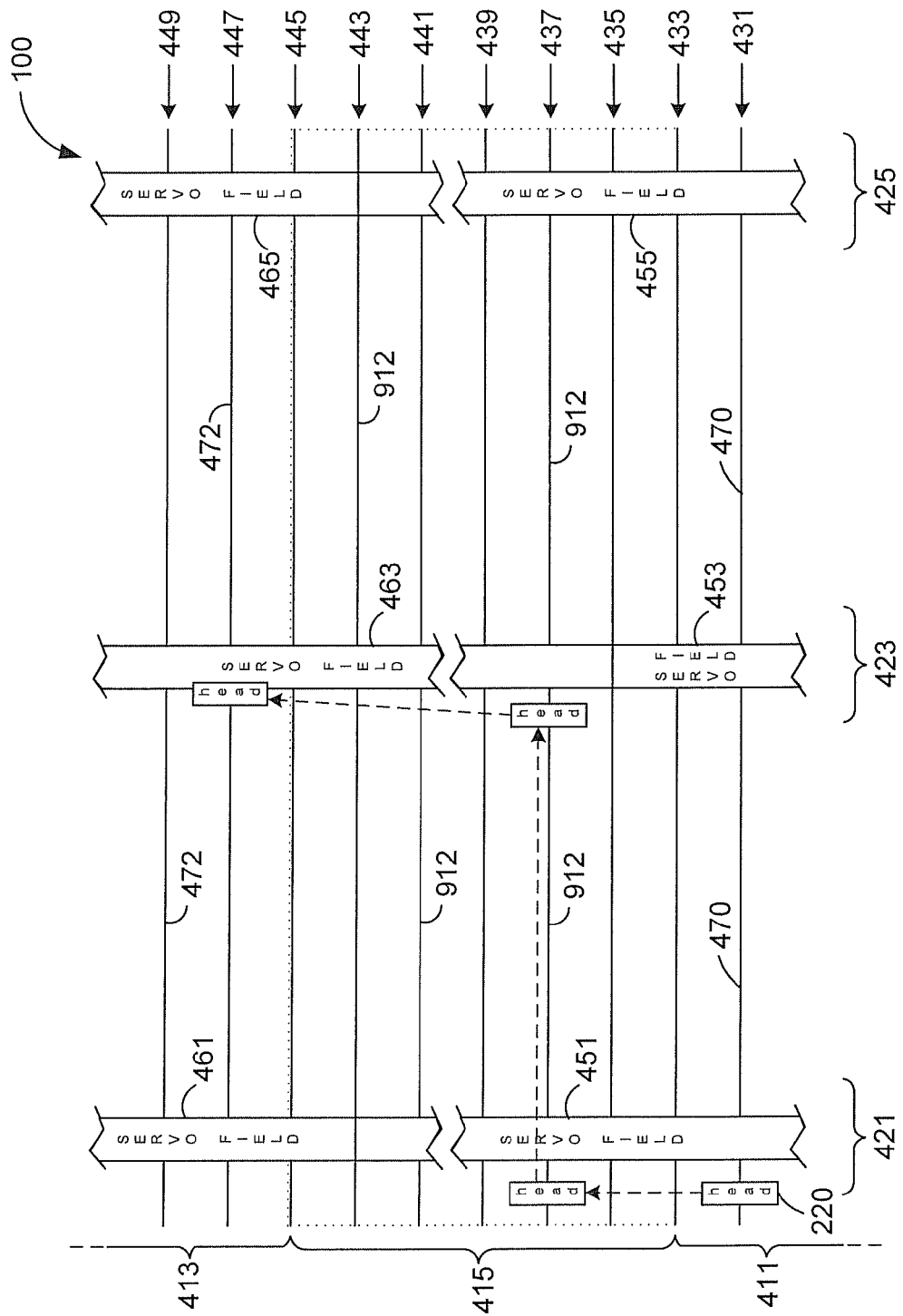
FIG. 4 is a close-Lip schematic of a section of a data storage medium with optimized servo format, according to other illustrative embodiments.

A more advantageous embodiment that deals effectively with the preceding performance issues is depicted in FIG. 4. This embodiment maintains guaranteed synchronization of the servo channel, predictability of the servo channel performance, and non-interruption of servo tracking and control. FIG. 4 shows a microscopic view of a portion of the medium 100. The features depicted in FIG. 4 are illustrative of features disposed around the wider medium 100. Tracks 431, 433, 435, 437, 439, 441, 443, 445, 447, and 449 are portions of concentric tracks that circumscribe medium 100, and are circle sections seen at close enough range that they resemble straight lines. Zone 411 is inward of zone 413, toward the center of medium 100, while zone 413 is outward of zone 411, toward the perimeter of medium 100.

This embodiment also includes guard band 415, which acts as a transition region between zone 411 and zone 413. Guard band 415 is configured to optimize the capability of the read/write head 220 to remain operating at the respective frequency specified for each of zones 411 and 413 while the read/write head 220 is in each zone, and to transition to the respective frequency of a new zone when the read/write head 220 moves to the new zone, whether one of zones 411 and 413, or another zone inward of zone 411 or outward of zone 413, according to different embodiments. This is illustrative of the substantial performance advantages provided by guard band 415.

Tracks on either side of the guard band 415, including tracks 431 and further tracks in zone 411, as well as tracks 447, 449, and further tracks in zone 413, are data tracks available for writing user data to and reading user data from. Servo sectors 421, 423, and 425 lie across the tracks, with the servo fields within one servo sector bordering at a different track within guard band 415 than the next servo sector. For example, as representatively depicted in FIG. 4, for servo sector 421, servo field 451 of zone 411 and servo field 461 of zone 413 border each other at track 443, close to the border between guard band 415 and zone 413, so that the servo field 451 from zone 411 extends across most of guard band 415 in servo sector 421; for servo sector 423, servo field 453 of zone 411 and servo field 463 of zone 413 border each other at track 435, so that servo field 463 from zone 413 extends across most of guard band 415 in servo sector 423; and for servo sector 425, servo field 455 of zone 411 and servo field 465 of zone 413 border each other at track 443, as in servo sector 421. In this way, a head 220 following one of the tracks between tracks 435 and track 443 encounters servo fields set at the servo frequencies of both zones 411 and 413, alternating with each other, as elaborated below. Guard band 415 thereby includes portions of servo fields from each of the two adjacent zones 411 and 413. This frequency overlap within guard band 415 allows a head to seek there while set to one frequency, and then sync reliably to the new frequency after it is in the guard band.

Tracks 433, 435, 437, 439, 441, 443, and 445 are included in the guard band 415. The number of tracks in a guard band, in different embodiments, may range from just one or two to very many, depending on other characteristics and design priorities of the system and other considerations. For example, it depends on reader and writer offset. As another example, it also depends on seek performance criteria such as undershoot, overshoot, resonance response, re-lock performance of the channel, shock performance, and other factors. This is indicated in FIG. 4 by the break in each of servo sectors 421, 423, 425. It is also undesirable for the head 220 to be operating on tracks too near an adjacent zone, because a shock or external vibration may displace the head 220 into the adjacent zone, which could cause loss of servo synchronization, and an operating delay while the head 220 re-obtains sync. In some embodiments similar to that of FIG. 4, from five to ten tracks provide an optimum guard band to avoid these performance issues. In another set of embodiments, it has been found advantageous to include about 80 tracks per guard band, as another example. Other embodiments may have more or fewer tracks than these examples. The guard band is designed so that even if the head 220 is operating in a data track closest to the zone boundary, it will not be driven into the adjacent zone by a shock or external vibration, within specified operating tolerances. Another consideration of the number of tracks in the guard band is the user data area loss. If no user data were allowed to be written in a guard band, then too many tracks in a guard band would also result in a lesser area to write user data.

Even with the tracks within the guard band being unavailable for writing user data, the gains in efficiency by reducing the circumferential extent of the servo fields provide a substantial overall gain in area available for writing user data. If the medium 100 is divided among too many zones, however, the frequency difference between adjacent zones may become small enough to raise the risk of false address mark (AM) identification. A variety of embodiments are possible that vary the number of frequency zones, the density of servo sectors, and the width of the guard bands to optimize for a variety of specifications and tolerances, and for a variety of applications.

While the tracks in the guard bands might not be used to store user data, they can be used to store system data such as drive code, drive parameters, and other drive information and applications, including system data that can be shifted away from the user data tracks, as described in more detail below. This further mitigates the loss of user data capacity involved in areas allocated to the guard bands.

Each servo field in zone 411 is disposed along a radial line segment of medium 100. Although the servo field is "wedge-shaped," due to being bounded by radial lines at an angle to one another, the servo field can still be described as coinciding with a radial line segment passing through the servo field. The radial line segment can define a unique radial line from the center of medium 100, passing orthogonally through the inner diameter and the outer diameter of medium 100, that coincides with and overlaps the radial line segment of a particular servo field. The radial line thus defined by each of the servo fields in zone 411 also coincides with or overlaps a corresponding adjacent servo field in zone 413 that lies in the same one of servo sectors 421, 423, 425. The different servo fields within each of servo sectors 421, 423, 425 thereby line LIP with each other along a common overlapping line, which extends radially through medium 100 in these illustrative embodiments.

FIG. 4 depicts the motion of head 220 as it seeks from zone 411 to guard band 415. Head 220 is depicted initially seeking from track 431 in zone 411 to track 437 in guard band 415, in an illustrative example of what could be a seek from anywhere in zone 411 to any track in guard band 415, before moving onward to anywhere in zone 413. After head 220 has done a seek to track 437 or a comparable track in guard band 415, head 220 is at first still set to the servo pattern of servo fields 451, 455, and the additional servo fields sharing the servo pattern of zone 411, which alternate within guard band 415 with the servo fields of zone 413, including servo field 463. While on track 437, head 220 attempts to sync to the new servo pattern of zone 413, which is available in servo field 463, for example. As shown in FIG. 4, in servo sector 423, the servo field 463 from zone 413 extends down to track 435. This allows head 220 to sync to the servo pattern of zone 413 in the guard band 415 at servo sector 423 or, if it doesn't achieve a sync to the new servo pattern on its first attempt, then at a similar, subsequent servo field extending into the guard band 415 from zone 413. Many data tracks are available within guard band 415 that intersect the servo fields of both zones 411 and 413, that provide an optimum chance for head 220 to sync to the frequency of the new zone to which it is seeking. Once head 220 has obtained sync to the new servo pattern, it seeks into zone 413, as depicted illustratively in FIG. 4 with a seek from track 437 to track 447 in zone 413.

This process is described here in one particular example that is illustrative of a variety of mechanisms and embodiments. In this particular example, to begin the process of seeking from zone 411 to zone 413, head 220 first seeks from data track 431 to track 437 within guard band 415, in servo sector 421. As head 220 goes from track following mode on track 431, the channel parameters for the new servo burst frequency are loaded, and a new servo search window for the servo burst of zone 413, such as is available in servo field 463, is generated.

A seek operation to cross guard band 415 may be illustrated as follows, according to illustrative embodiments. A track-following servo controller (not separately depicted) within internal circuitry 239 (as depicted in FIG. 2), controllably moves the suspension 210 to controllably position read/write head 220 in accordance with the position error signal (PES), to maintain the read/write head 220 centered relative to a given servo track within the servo fields, such as track 437 at servo sector 421, for example. The servo controller is then switched to half-rate for its passage through guard band 415, in these illustrative embodiments. The channel searches for the servo address mark of the new frequency of zone 413 with timing to seek to the new zone in servo sector 423. If head 220 can successfully lock to the new frequency, that of zone 413, then the servo feedback signal is maintained from the servo burst with the frequency of zone 413, and the head 220 seeks across guard band 415 to data track 447 in zone 413, as depicted in these embodiments.

If the address mark of the new servo bursts or servo sectors in zone 413 are not found, the old channel parameters for zone 411 are re-loaded, and the servo will search for the servo burst of servo sector 425 with the servo frequency of zone 411 again. Since the track following servo controller is set for half rate, servo sector 425 provides the subsequent PES after servo sector 421. The head 220 then repeats the process of searching for the new servo address mark of zone 413 until it gets successfully synchronized, in these illustrative embodiments.

The embodiments of FIG. 4 are particularly advantageous for a system in which the time required to switch from the frequency of one zone to the frequency of another zone is longer than half of a normal servo sector time, i.e. the length of time from the head 220 passage over one servo sector to the head 220 passage over the subsequent servo sector, e.g. from the passage over servo sector 421 to servo sector 423. In some illustrative embodiments, for example, the medium 100 is incorporated in a data storage system such as disc drive 205 that is a fraction of one inch across, and the servo sector time is in the neighborhood of 100 microseconds. Embodiments such as those illustratively depicted in FIG. 4 may be of particular benefit for such a small disc drive, since it may also have a lower servo burst frequency than a larger disc drive. For example, one illustrative sub one inch disc drive uses a servo burst frequency of 15 MHz (at a rotational speed of 3600 rpm), while a representative larger size 3.5 inch drive uses a servo burst frequency of 60 MHz (at a rotational speed of 5400 rpm). Because the smaller drive has a lower servo frequency, it also has lower format efficiency, and all the more to gain by improving on that efficiency by implementing an optimized servo format such as the embodiments disclosed herein.

The strategy of loading read channel servo parameters for different sets of servo burst frequencies in the guard band 415, in illustrative embodiments, is to maintain operational condition for both the sets. This is achieved by saving a copy of critical read channel servo parameters (copy X) such as the frequency registers, programmable filters and adaptive filters values upon the exit of a current servo frame/burst (frequency X) and loading read channel servo parameters for the next servo frame/burst which is at the new frequency (frequency Y). Again, upon the exit of the new servo frame/burst with frequency Y, a copy of the read channel servo parameters (copy Y) is saved by the controller. Copy X is then loaded in preparation for entry into the servo frame with frequency Y. This process is repeated until the servo frame/burst with frequency Y of the next zone is locked on and the head 220 moves out of guard band 415. The time required to load new parameters for a new servo burst frequency is in the range of 10 microseconds or less, in some illustrative embodiments. This allows plenty of time for the channel to load the parameters for one or another zone's frequency between one servo sector and the next.

Figure 5:
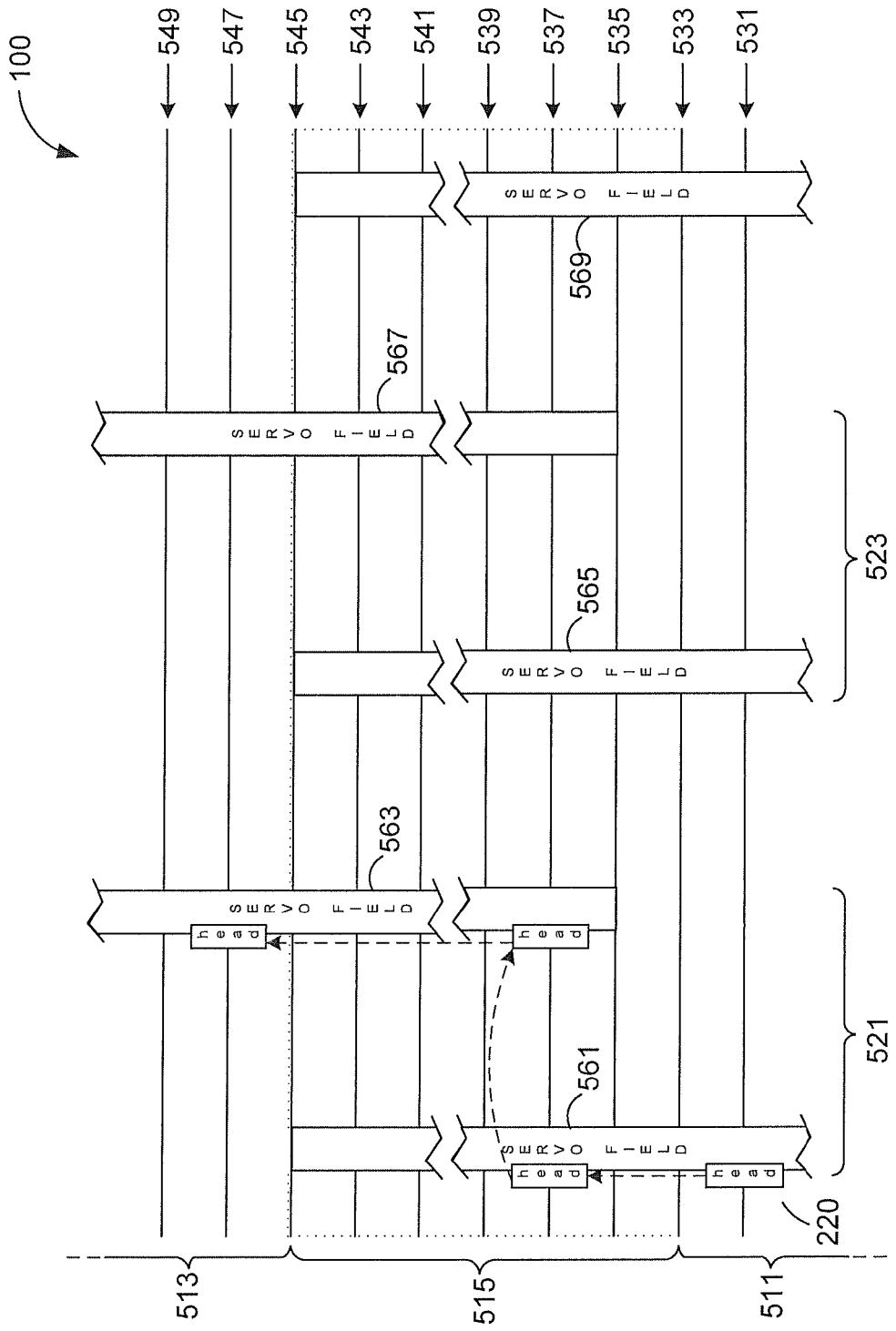
FIG. 5 is a close-up schematic of a section of a data storage medium with optimized servo format, according to other illustrative embodiments.

FIG. 5 depicts other illustrative embodiments that are similar to the embodiments of FIG. 4, and are particularly advantageous for a system in which the time required to switch from the frequency of one zone to the frequency of another zone is within half of a normal servo sector period. In writing the servo pattern, if the writing head 220 is able to switch servo burst frequency within a half sector, then one-pass write can be used, as in FIG. 5. Otherwise, the servo bursts in the transition zones can be written in two-pass, as in FIG. 4. In some illustrative embodiments, for example, the medium 100 is incorporated in a data storage system such as disc drive 205 that is a fraction of one inch across with a servo sector time somewhere of 100 microseconds, while the system can switch from the frequency of one zone to the frequency of another zone in around 40 microseconds or less. To take advantage of this, the zone 513 servo burst timing positions are shifted by half of a servo sector from the servo fields of zone 511.

The illustrative embodiments of FIG. 5 is another example that maintains guaranteed synchronization of the servo channel, predictability of the servo channel performance, and non-interruption of servo tracking and control. FIG. 5 shows a microscopic view of a portion of a medium 100, in which tracks 531, 533, 535, 537, 539, 541, 543, 545, 547, and 549 are portions of concentric tracks that circumscribe medium 100, and are circle sections seen at close enough range that they resemble straight lines. Zone 511 is inward of zone 513, toward the center of medium 100, while zone 513 is outward of zone 511, toward the perimeter of medium 100. These illustrative embodiments also include guard band 515, which acts as a transition region between zone 511 and zone 513. Tracks 533, 535, 537, 539, 541, 543, and 545 are included in the guard band 515. Tracks on either side of the guard band 515, including tracks 531 and further tracks in zone 511, as well as tracks 547, 549, and further tracks in zone 513, are user data tracks available for writing user data to and reading user data from. The features depicted in FIG. 5 are illustrative of features disposed around the wider medium 100.

Servo sectors 521 and 523 lie across the tracks, and each includes one servo field from zone 511 and one servo field from zone 513. Servo sector 521 includes servo field 561 from zone 511 and servo field 563 from zone 513, while servo sector 523 includes servo field 565 from zone 511 and servo field 567 from zone 513. (Servo field 569 forms a portion of another servo sector, not individually labeled.) Servo sectors 521 and 523 differ from those in FIG. 4 in that each of the servo sectors 521, 523 comprises servo fields that are angularly offset from each other, so that the servo fields within a single servo sector overlap some of the same tracks within guard band 515, for example. In particular, servo fields 561, 565 and 569 are in the inner zone 511, while servo fields 563 and 567 are in the outer zone 513.

Read/write head 220 is depicted in FIG. 5 to have an initial position in zone 511 (as an example, on track 531), at servo field 561 in servo sector 521, and is preparing to seek to zone 513, as an illustrative example of operation with medium 100. Head 220 first seeks to guard band 515; specifically, for example, to track 537, also on servo field 561, which extends across guard band 515. Once head 220 has entered guard band 515, the channel parameters for the new servo burst frequency are loaded and a new servo search window for the servo burst of servo field 563 are generated. The channel will search for the servo address mark in servo field 563 of the new frequency of zone 513 at a half sector time away from servo field 561. If the channel can successfully lock to the address mark at the new frequency of zone 513, then the servo feedback signal switches to the servo burst with the new frequency of zone 513. Otherwise, the old channel parameters for zone 511 are reloaded, and the channel will search for the servo burst with the servo frequency of zone 511 again. Then, the head 220 will repeat the process of searching for the new servo address mark of zone 513 until it successfully gets synchronized.

Figure 6:
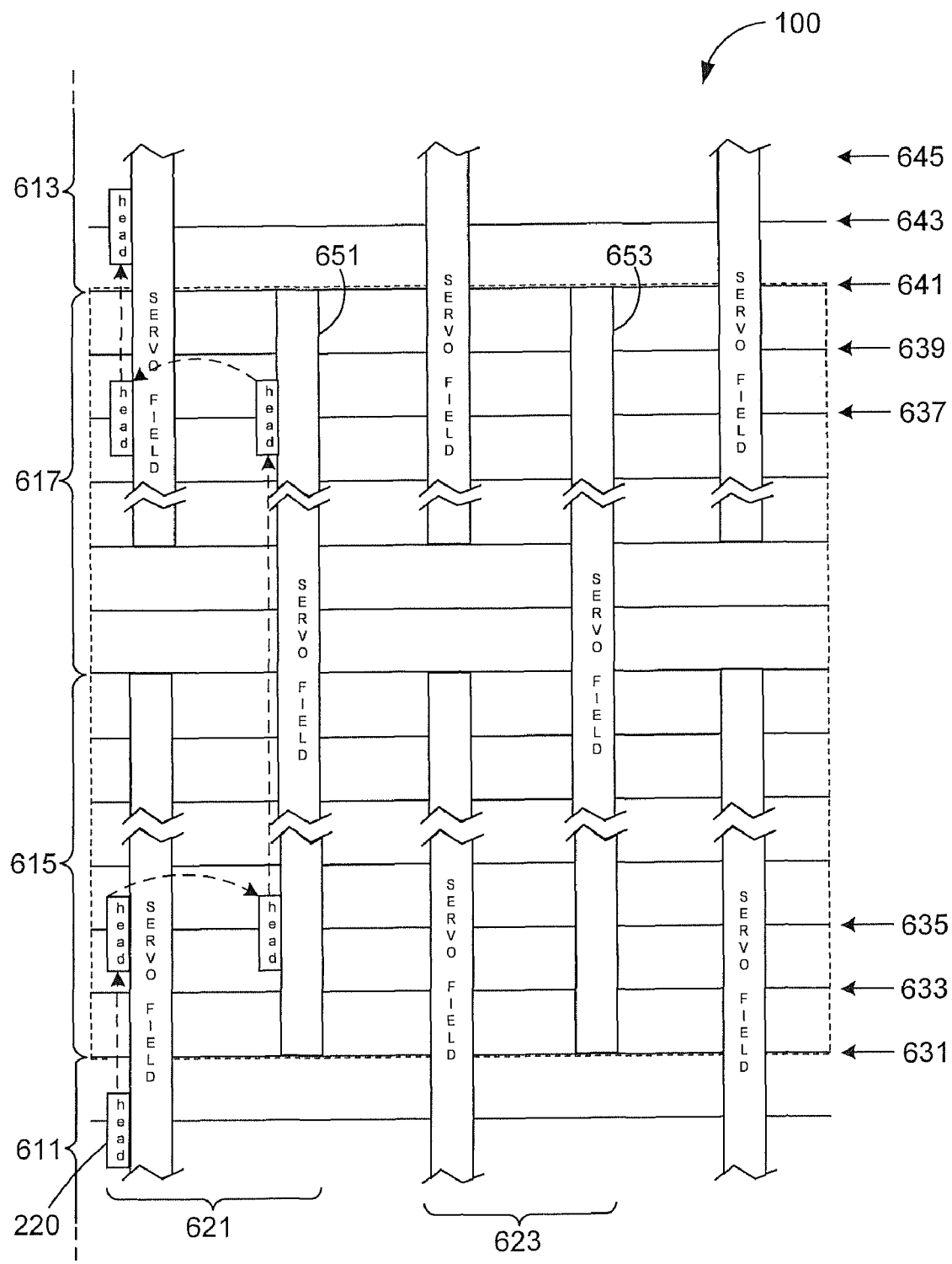
FIG. 6 is a close-up schematic of a section of a data storage medium with optimized servo format, according to other illustrative embodiments.

FIG. 6 depicts another illustrative embodiment, this one including transitional servo field segments 651, 653 within an adjacent pair of guard bands 615, 617. Guard bands 615, 617 may contain any of a wide number of tracks, as indicated by the breaks depicted in the servo fields in both guard bands 615, 617. These embodiments also have servo fields in adjacent zones lined up in the same radial servo sectors, doing without a servo sector period shift from zone to zone as in the embodiments of FIG. 5. Medium 100 includes two guard bands 615, 617, disposed side by side between inward zone 611 and outward zone 613. In guard band 615, servo frequency switching is accomplished as described above. In guard band 617, head 220 re-locks to the servo bursts of zone 613 on a servo field coinciding along a radial line with the servo field it started seeking through the guard bands from, in servo sector 621. Medium 100 therefore includes some transitional servo field segments 651, 653 that are offset from the radial lines coincident to the servo fields in both the inner zone 611 and in the outer zone 613. Transitional servo field segments 651, 653 are angularly separated from the servo fields in the first zone 611 and from the servo fields in the second zone 613.

Figure 7:
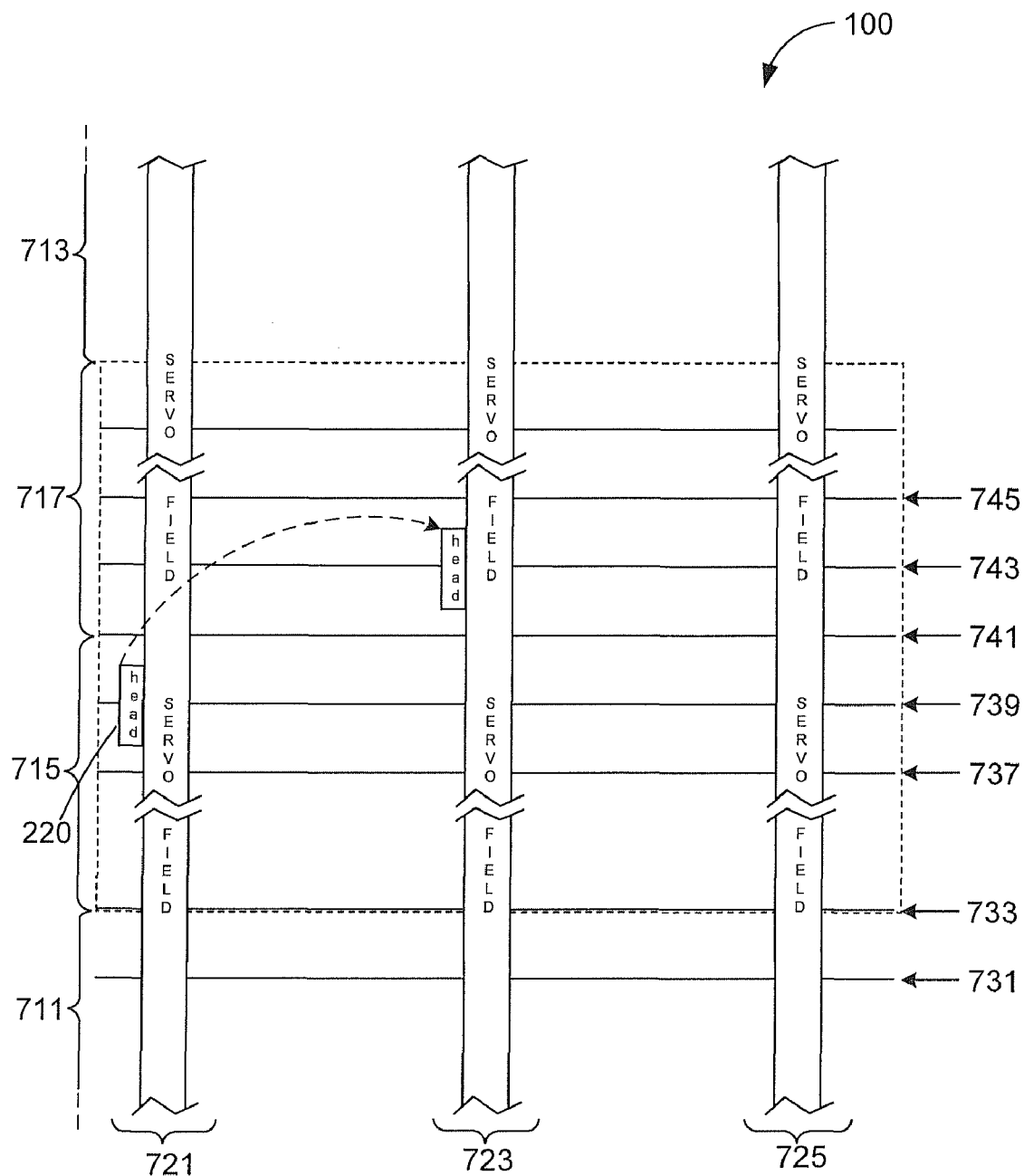
FIG. 7 is a close-up schematic of a section of a data storage medium with optimized servo format, according to other illustrative embodiments.

FIG. 7 depicts other illustrative embodiments, also with two guard bands 715, 717 between adjacent zones 711, 713, and also without a servo sector timing shift. These illustrative embodiments also lack an overlap in servo fields on any data tracks. Medium 100 includes two guard bands 715, 717, disposed side by side between inward zone 711 and outward zone 713. In guard band 715, when the predicted position of head 220 in the subsequent servo sector (such as sector 723) is in second guard band 717, servo frequency switching is accomplished as described above. Head 220 then seeks from servo sector 721 in guard band 715 to servo sector 723 in guard band 717. If head 220 is able to sync successfully with the frequency of outward zone 713, it passes out of second guard zone 717 into outward zone 713; otherwise it repeats the attempt to sync in the next servo sector. Guard bands 715 and 717 provide further assurance of the reliable performance of head 220 in each of representative zones 711 and 713.

In any of the above or further embodiments, the depicted elements are representative of any number of zones, guard bands, servo sectors, and other elements that can be selected in different embodiments. For example, a medium 100 may have zones determined by dividing equal portions of the radius of the medium 100; in other embodiments, it is more efficient to use uneven spacing for the boundaries between zones, such as by increasing the radial width of the outer and/or outward zones, which have tracks of greater arc length, and a lowered radial width of the inner and/or inward zones. Tracks closer to the outer diameter are capable of holding more data, so if servo zones closer to the outer diameter have more tracks, it can further improve the format efficiency.

As another example, the fast sync-up time is a significant factor in determining optimum relative zone sizes. In some disc drives of one inch or less in diameter, for example, the ramp load/unload technique may be used. The load/unload ramp may be located on either the inner diameter or the outer diameter of the medium 100, in various embodiments. When the initial sync-up is done in the inner zone, the head can be tuned to the inner zone servo burst frequency. During the address mark (AM) locking period, the head can shuttle in the inner zone under a back electromotive force (BEMF) speed/position control feedback signal. Since the inner zone crash stop location can be easily determined, the stroke of the shuttle action can be easily confined to the inner zone. In case of a retry from a missing AM, the head can switch to the servo burst frequency of the inner zone and move back to the inner zone to re-sync up.

Initial loading in the outer zone is also based on a BEMF feedback signal, in some embodiments. Experimentation on some illustrative embodiments with a ramp at the outer diameter, in various operating conditions, has shown that the first sync up location is often in the middle of the outer zone of the medium 100, adjacent the outer diameter. This first sync-up can use feedback from a gray code in the servo fields, for example. After sync-up and good gray code is available from time to time, the feedback signal for head velocity control can be switched from BEMF to gray code. As the velocity loop in sync-up process has a relatively low bandwidth, the good gray code feedback signal can be much less frequent than PES in track following control.

To achieve a fast sync-up, an embodiment having a relatively larger outer zone may be advantageous in providing certainty that the initial sync-up will take place there, rather than allowing a significant risk of the read/write head moving to the next inward zone prematurely and losing sync. Preventing the head from moving prematurely past the outer zone is also easier with the head velocity relatively low, for example, less than one inch per second, in illustrative embodiments. After the first sync-up in the outer zone, the velocity reference may be reduced to zero, in these embodiments, to further prevent the head from crossing the zone boundary prematurely. With the head position estimated with reference to the BEMF feedback signal, if the estimated head position is too close to the zone boundary, the velocity reference may be changed to the opposite direction. Another method of assuring sync-up is to toggle between the servo frequencies of the outer zone and the next inward zone until the head successfully locks up to the servo bursts of its position.

The seeking operations within a given servo zone are similar to those in conventional data storage systems, in illustrative embodiments. When seeking across servo zones, the frequency in the servo fields change. The servo channel needs to change accordingly to sync to the new frequency. A track position prediction of the next servo sector, and evaluating whether it belongs to another zone, are important for preparing the channel for the new zone. For state feedback control, the track prediction can be done directly from the position variable in the state estimator.

Generally, with X as the head position, V as the head velocity, and A as the head acceleration, the track prediction can be derived by $X(k+1)=X(k)+V(k)+0.5*A(k)$ $V(k)=V(k-1)+A(k-1)$ $X(k)=X(k-1)+V(k-1)+0.5*A(k-1)$ These can be used to derive the following relations:

$V(k-1)=X(k)-X(k-1)-0.5*A(k-1)$ $V(k)=X(k)-X(k-1)+0.5*A(k-1)$ $X(k+1)=X(k)+X(k)-X(K-1)+0.5*A(k-1)+0.5*A(k)$

The track prediction by the last of these relations is accurate enough for prediction of the zone of the next servo sector. If a more accurate prediction is desired, a relation can be used which further includes corrections for code delay. This is illustrative of one possible example among many servo algorithms that may be used to perform track prediction.

If the estimated track of the next servo sector will be in the next frequency zone, the channel loads the parameters for the next frequency zone at the boundary track. With a parallel interface channel, the time for switching between two sets of parameters for two adjacent zones is within 20 microseconds, in illustrative embodiments. The servo synthesizer settling time can be controlled to less than 30 microseconds, in these embodiments. For a sub-one-inch disc drive with limited servo sampling frequency, there is enough time for frequency switching before a subsequent servo frame with a different frequency. In embodiments in which the servo channel has pre-stored banks of servo channel data, the switch to the new frequency is even faster.

Servo fields may be written in different ways, including in-situ and ex-situ. For in-situ written systems with more than one head (such as STW, self-servo), the current head and the head to be switched to will be on the same track and the same zone from one medium 100 to another. Head switching then correlates for each of the heads across the mediums 100. However, head switching is a little more complicated in embodiments that have had the servo fields written ex-situ.

For ex-situ written systems, there may be a variation or skew in the alignment, between the different heads and corresponding mediums 100 within the system. For example, this skew was found to be as much as 800 tracks in illustrative embodiments in which each medium 100 had a track density of 100,000 tracks per inch. Because of this skew, one head may be in one zone while other heads are in adjacent zones on their corresponding mediums 100. The position of a head to be switched to, i.e. a target head, is needed for setting the proper zone parameters for the servo channel during the head switch. The head alignment offset between heads follows a curve having a sine waveform with some DC component. The head alignment offset between the heads in some embodiments has been calibrated in a certification test to evaluate the head alignment offset, including DC offset, AC peak, and AC peak location, for each zone boundary, including the outer diameter, the intermediate diameter zone boundaries, and the inner diameter. With the calibration data and the prediction of the current head position at the next servo sector, the target head position at the next sector can also be computed. The computed position of the target head is used to avoid switching the head position to an unusable track between zones and the resulting missed sync-up. The computed position of the target head at the next servo sector is evaluated prior to a head switch. If it is outside of an unsafe head switch position, the decision to switch to the target head can be made. Whether the target head position is in a new frequency zone is also evaluated, and a frequency switch is also performed if needed. The algorithm used therefore insures that the heads will be kept in safe tracks where they will remain in sync, despite any head skew. This demonstrates illustrative embodiments of a means for controllably positioning the read/write head from a first one of the zones to a second of the zones, and a means for changing the operating frequency of the read/write head from the respective frequency of the first one of the zones to the respective frequency of the second one of the zones, included within illustrative embodiments of a data storage system.

If the head does lose sync, there are a number of techniques that may help it regain sync with the servo tracks, any or all of which may be applicable to given embodiments. Re-sync can be done in a zone with zero bias force position. When servo sync is lost, the head can be switched to zero velocity control based on BEMF and then left to drift to a zero force bias position. Then the channel parameters for that zone are set, and re-lock is attempted. If this fails, the head can be unloaded to restart sync-up with the head being re-loaded.

As another technique, when sync is being lost, the servo switches to BEMF control. Based on the last track number, velocity, and acceleration information before losing sync, and integration of the BEMF, the head can be approximately controlled into a selected zone. The head shuffles in this zone and tries to re-lock. If this attempt times out, the head is unloaded and sync-up is restarted from head loading. Whatever re-sync technique is used, the demodulation sync process should ensure a sufficient track clearance from a zone boundary before turning control over to a recovery seek process, to make sure the actuator builds up enough velocity for crossing the zone boundary.

The embodiments described so far have dealt generally with a guard band of tracks medially disposed between and contiguous to a first band of consecutive user data storage tracks servo formatted with a first frequency and a second band of consecutive user data storage tracks servo formatted with a second frequency different than the first frequency. The guard band is provided as a place not to store and retrieve user data in the normal course of processing access commands, but rather as a frequency shift "safe harbor" where the head can sync to a different frequency before entering the zone associated with the new frequency.

Figure 8:
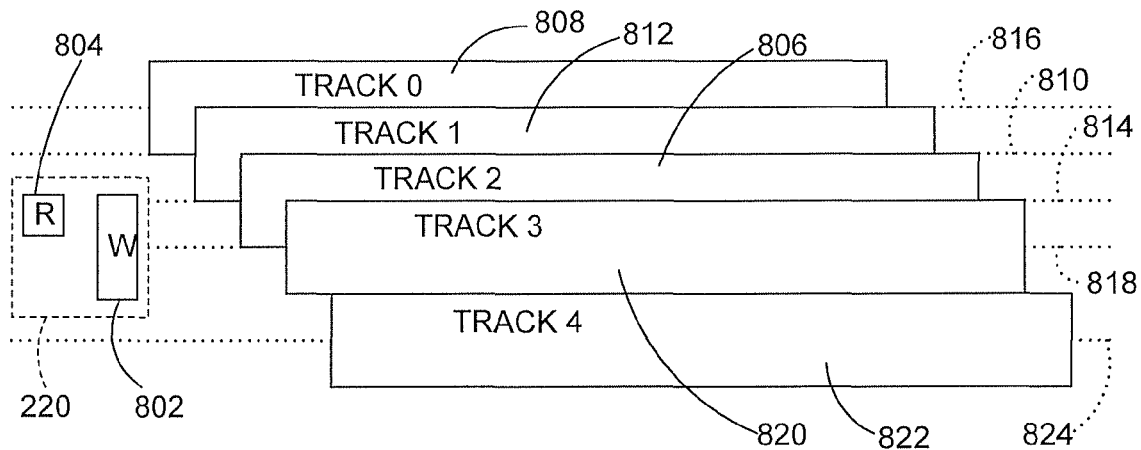
FIG. 8 is a diagrammatic depiction of overlapping user data tracks used in conjunction with the optimized servo format, according to other illustrative embodiments.

However, frequency shifting is not the only purpose for which guard bands of storage tracks are used between and contiguous to two zones of user data storage tracks. FIG. 8 depicts the head 220 having separate write (W) and read (R) elements 802, 804, respectively. The write element 802 is preferably an inductive horizontal or vertical writer, and as described above the read element can be of any desired construction such as but not limited to MR, GMR, TGMR, and SV.

As depicted, the effective radial width of the write element 802 is greater than that of the read element 804. This means that only a portion of the radial width of a written track is necessary for reading stored data from the track. To store data to the medium 100 in the arrangement depicted in FIG. 8, the head 220 can be initially positioned so as to place the write element 802 in a substantially centered relationship over track centerline 806. The head 220 then tracks at that radial position while storing data to a first track 808 (Track 0). As depicted, data stored in the first track 808 will initially have a radial width substantially equivalent to that of the effective width of the write element 802.

On a subsequent pass (another rotation) of the medium 100, the head 220 seeks to substantially center the write element 802 over the adjacent track centerline 810. The head 220 then tracks at that radial position while storing data to a second track 812 (Track 1). The second track 812 partially overlaps the first track 808, and thereby partially overwrites it, but the first track 808 retains a sufficient radial width to permit the read element 804 to read the data stored to it.

Any number of additional overlapping tracks can be written in this manner. For example, by tracking on centerline 814 a third track 816 (Track 2) can be written that partially overlaps the second track 812; by tracking on centerline 818 a fourth track 820 (Track 3) can be written that partially overlaps the third track 816; and so on.

This partial overlapping of tracks increases the track density on the medium 100, and can thereby significantly increase the total storage capacity of the medium 100. The limiting factor for track density becomes a factor of the read element 804 instead of the write element 802.

However, the use of overlapping tracks raises issues regarding the operational overhead that is required to update data that was previously stored in an overlapped track. For example, in order to update the data on the second track 812, merely aligning the write element 802 with centerline 810 and performing a new write operation to the second track 812 will also result in the undesired overwriting of the data stored to the third track 816. Thus, in order to update data stored to the second track 812 without losing the data stored to the third track 816 it is necessary to first read and temporarily buffer the data stored to the third track 816 and stored to the fourth track 820, update the data to the second track 812, and then rewrite the buffered data to the third track 816 and to the fourth track 820.

Thus, the overlapping track arrangement of FIG. 8 is well suited for data that is characterized as seldom being updated. Otherwise, updating data stored to an overlapped track requires first buffering and then restoring all data in downstream overlapping tracks. For purposes of this description "downstream" is a relative term with respect to the radial direction with which the next overlapping track is written. That is, the overlapping can be performed either inwardly or outwardly across the medium 100.

Preferably, one or more non-overlapping tracks such as the fifth track 822 is periodically formatted with its centerline 824 being disposed a full write element 802 width from the adjacent centerline 818. The non-overlapping track or tracks serve as a guard band ceasing the cascading effect of the overlapping tracks. That is, the data stored to the fourth track 820 can be updated without overwriting data previously stored to the fifth track 822.

Figure 9:
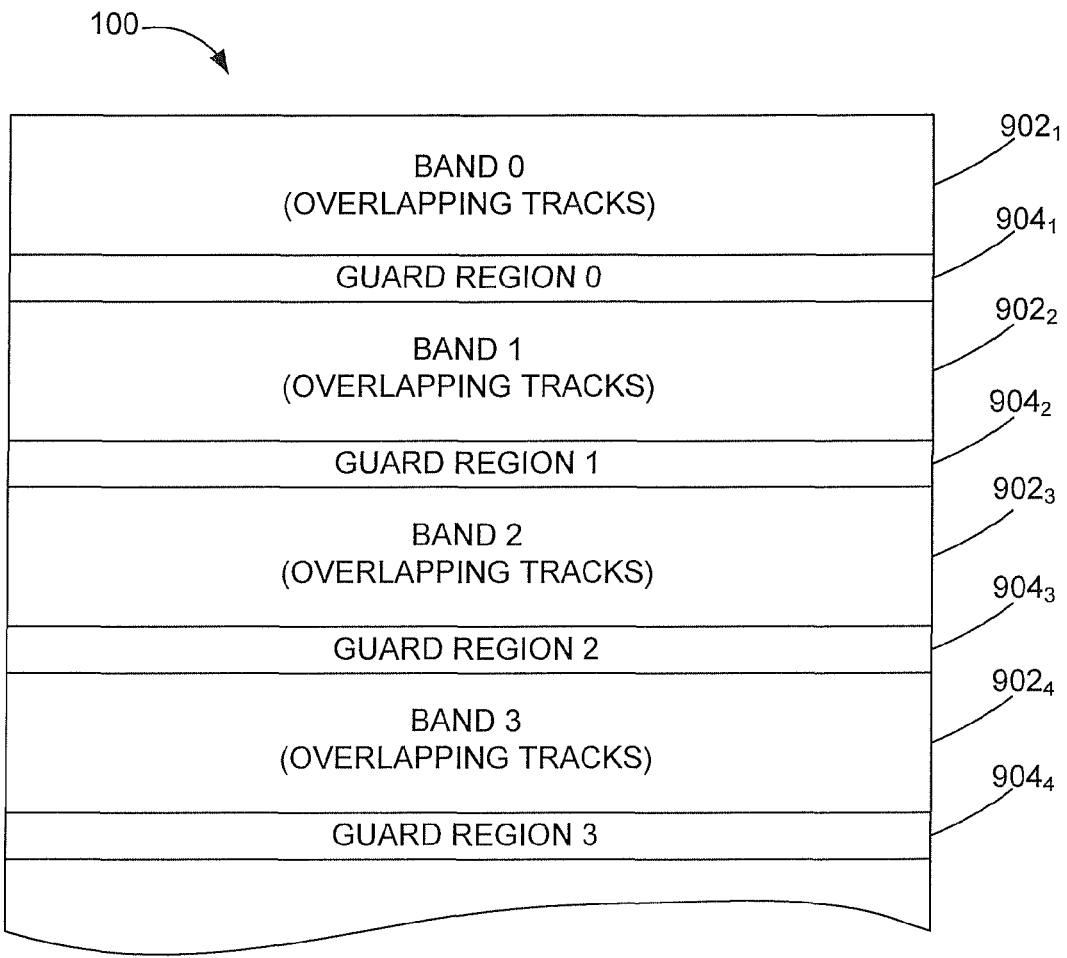
FIG. 9 is a diagrammatic depiction of a section of a data storage medium with a plurality of bands of overlapping tracks and optimized servo format, according to other illustrative embodiments.

FIG. 9 diagrammatically depicts a manner in which a plurality of these bands of overlapping tracks can be arranged on the medium 100 in accordance with advantageous embodiments to increase the storage capacity of the medium 100. A plurality of bands 902 includes a first band 902$_1$ of consecutive overlapping user data storage tracks and a second band 902$_2$ of consecutive overlapping user data storage tracks, with an annular guard band 904$_1$ medially disposed therebetween and contiguous to both bands of user data storage tracks 902$_1$, 902$_2$.

Two different purposes have been described for allocating some tracks as guard tracks medially disposed between two bands of contiguous user data tracks, the purpose of facilitating smooth frequency shifting between bands and the purpose of separating bands of overlapping tracks. These purposes are illustrative and not limiting of all the purposes for which guard tracks might advantageously be formatted in the medium 100. In any event, however, setting tracks aside for use as guard tracks typically makes it disadvantageous to store user data in them. For example, an attempt at storing and retrieving user data to guard tracks separating different frequency zones in the normal course of data transfer operations would diminish the intended benefit of having the guard tracks for the purpose of smoothly shifting frequencies between the adjacent zones. That is, such an arrangement would often require the overhead resources and time penalty associated with obtaining sync to a different frequency, at half the normal sample rate, for retrieving the limited amount of user data that can be stored in the relatively few tracks allocated to be guard tracks. Also, in either of the examples set forth above, storing user data in the guard tracks will tend to disperse the user data that could more efficiently be stored in contiguous tracks, thereby increasing the seek time for retrieving the user data.

Nonetheless, not using the guard tracks for storing anything but servo sectors means paying the penalty of less than the optimal utilization of the medium 100 total storage capacity. The guard tracks described herein are well suited for storing information that is stored once and seldom retrieved. The present embodiments take advantage of that by storing system sectors to the guard tracks. That frees up the storage space that the system sectors would otherwise be stored to, thereby recovering valuable user data storage space that would otherwise be lost due to the system sectors being stored elsewhere than the guard tracks.

System sectors have certain system data stored therein concerning the configuration and operation of the data storage device. For purposes of this description and the appended claims, "system data" means non-servo configuration and operation data such as information concerning zone configurations, frequencies with which data is stored in the various zones, reassignment tables that associate virtual addresses to physical addresses on the medium 100, sector defect lists, and the like. The system data is used by a device controller in the data storage device to control its operation during the normal course of user data transfer operations. Typically, at power-on and reset conditions the system data is read once to the device controller to govern the storage device operation.

At power-on a computing device initially executes a boot sequence that informs the operating system of the location of a minimum number of files necessary to obtain operational control and carry on with the boot sequence to achieve a ready/standby state. Those initial files are sometimes referred to as boot sectors, which can be stored in the locations described herein as being allocated for system sectors. For example, executing the boot sectors can result in first loading a reserve sectors map (RSM) that informs the operating system as to the location of all the files, or system sectors, in a reserved zone.

Figure 10:
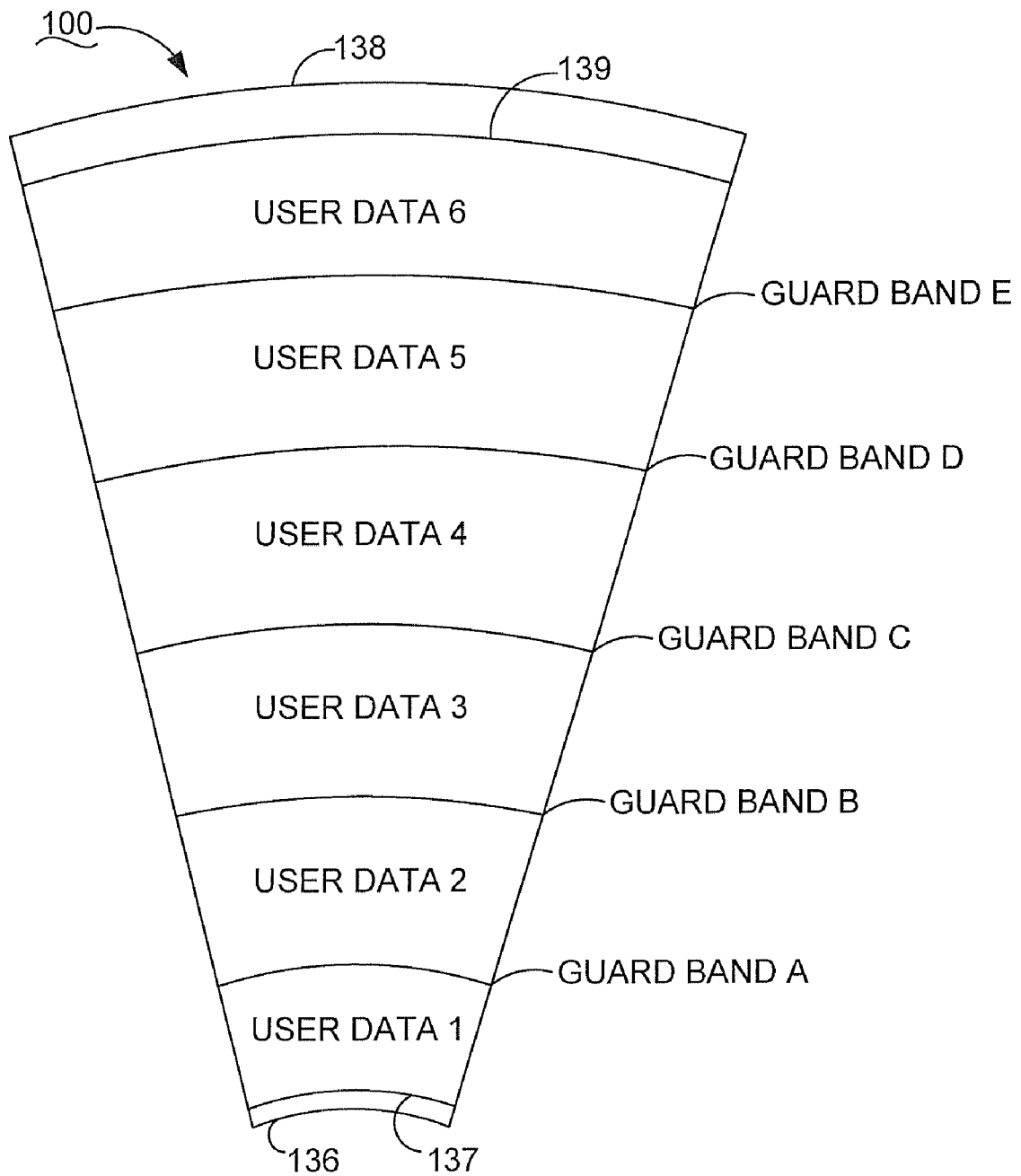
FIG. 10 is a diagrammatic depiction of a section of data storage medium with a plurality of guard bands according to other illustrative embodiments.

FIG. 10 is a diagrammatic depiction of a sector of the storage medium 100, showing portions of its inner and outer edges 136, 138 adjacent its innermost and outermost user data storage tracks 137, 139. Six bands of consecutive user data storage tracks are separated by five respective guard bands of one or more tracks. The bands of consecutive user data storage tracks can have data stored thereto with different frequencies, or they may be bands of overlapping tracks, or they may be zoned for another reason. In any event, the system sectors might be entirely stored in Guard Band A. Clearly, by being "entirely" in Guard Band A can include other system sectors in the same tracks as in Guard Band A and other sectors of the medium 100. However, if more storage capacity is needed for the system sectors, then a first portion of the system sectors can be stored in Guard Band A and a second portion of the system sectors can be stored in Guard Band B. In that case, loading the RSM can result in the system mapping all the locations of the system sectors in both guard bands. Alternatively, loading the RSM can result in the system only mapping the locations of the system sectors in Guard Band A. The system sectors in Guard Band A can include executable instructions that map the additional system sectors in Guard Band B.

Generally, the system sectors contain system data. For purposes of this description and meaning of the appended claims, the term "system data" is generally distinguished from "user data" in that the system data is information used by the data storage device in controlling its operations in the normal course of data transfer steps. User data is the object of host access commands that store data to and retrieve data from the user data zones that do not include the guard bands where the system sectors reside.

Figure 11:
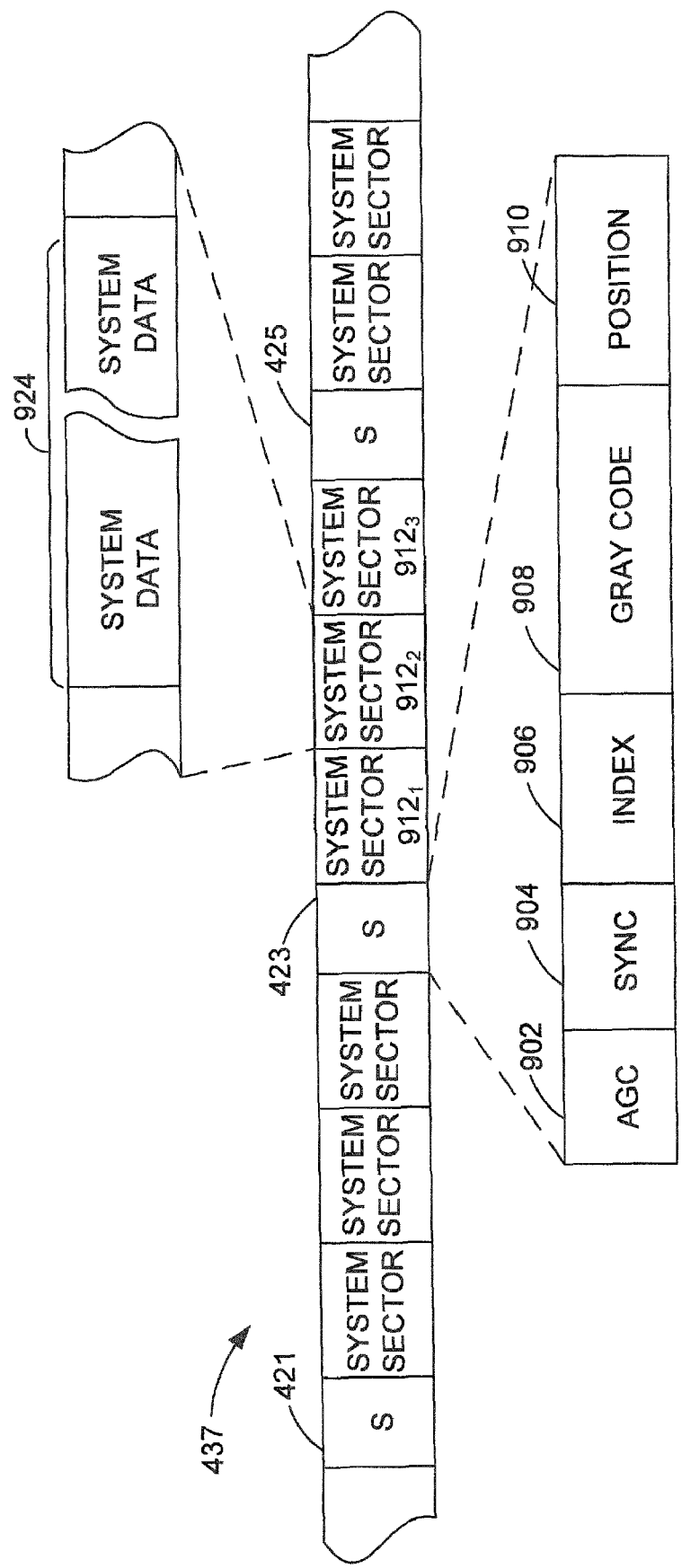
FIG. 11 is a schematic depiction of a servo sector format and a system sector format in illustrative embodiments.
Figure 12:
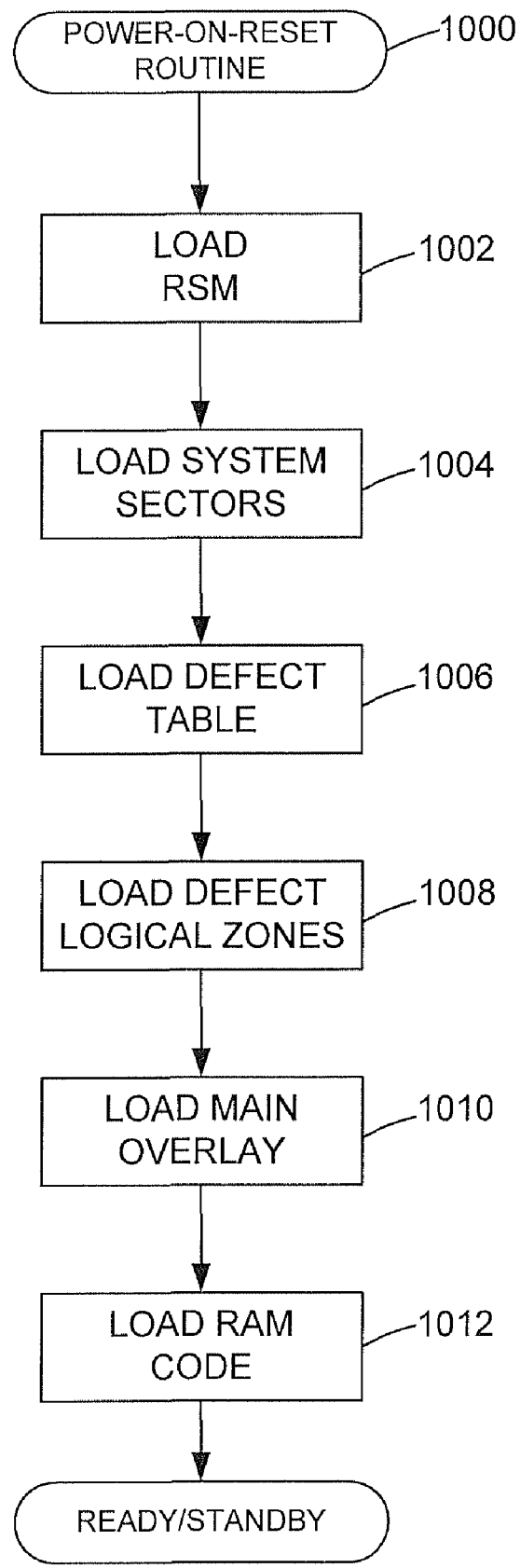
FIG. 12 is a flowchart depicting steps in a power-on-reset routine in accordance with illustrative embodiments.

FIG. 11 is a diagrammatic depiction of the track 437 to which the head 220 is initially tracking in FIG. 4. While the servo format arrangement of FIG. 4 associated with zoned user data tracks for frequency shifting is referred to, the purpose for doing so is merely illustrative and not limiting of the claimed embodiments. That is, the following discussion is also applicable to zones of overlapping user data tracks or zone formatted user data tracks generally.

Each of the servo fields 421, 423, 425 include an automatic gain field (AGC) 902, a synchronization field (SYNC) 904, an index field (INDEX) 906, a Gray code field (GC) 908, and a position field (POSITION) 910. The AGC 902 stores an oscillating pattern (such as a 2T pattern) used to prepare the servo circuitry for remaining portions of the servo field 423. The SYNC 904 stores a unique bit pattern that identifies the field as a servo field. The INDEX 906 indicates angular position of the head 220 with respect to the medium 100. The GC 908 stores track address information to indicate radial position of the head 220. The POSITION 910 has dibit burst patterns to allow generation of a position error signal to identify inter-track head 220 location.

Between adjacent servo fields 423, 425 system sectors $912_1$, $912_2$, $912_3$ are formatted to the medium 100. The three such system sectors is illustrative and not in any way limiting of the contemplated embodiments, as the size and number of system sectors 912 between adjacent servo fields is dependent upon the servo sampling rate and the allocated storage capacity for each system sector 912.

Encoded system data blocks are stored in the data field (SYSTEM DATA) 924. Such data blocks are generally composed of a fixed-size block of data and an associated number of error correction code (ECC) bytes. The size of the system data blocks will generally be established by the host device operating system at the time of formatting; typical values are 512 bytes, 1024 bytes, 4096 bytes, etc.

Summarizing, FIG. 4 depicts the storage medium 100 as having a guard band 415 having a plurality of guard tracks 433-445. Note that in these illustrative embodiments there are a plurality of guard tracks in the guard band 415. Preferably, the innermost guard track 433 is consecutive with the outermost user data storage track 431 in the band 411, and outermost guard track 445 is consecutive with the innermost user data storage track 447 in the band 413.

One or more of the guard tracks, such as guard track 437, define system sector fields of system sectors 912 stored thereto between adjacent servo fields 421, 423, 425. The data storage tracks in the band 411 define user data fields of user data sectors 470 stored thereto also between adjacent servo fields 421, 423, 425. Likewise, the data storage tracks in the band 413 define user data fields of user data sectors 472 stored thereto also between adjacent servo fields 421, 423, 425. The user data sectors 470, 472 in the same sector of the medium 100, such as between servo fields 421 and 423, and the system sectors 912 in the guard tracks 433-445 can form a continuous non-servo data field extending radially from an innermost data storage track of the first band 411 to an outermost data storage track of the second band 413. In the bands 411 and 413 this non-servo data field contains user data sectors, and in the guard band 415 this non-servo data field contains system sectors.

With reference to FIG. 10, the format described above can be carried across two or more guard bands where the storage capacity of one guard band is insufficient to store all the system sectors. The system sectors can be stored in two or more guard bands adjacent consecutive bands of user data storage tracks, such as in Guard Track A and Guard Track B. Alternatively, the system sectors can be stored in two or more guard bands adjacent non-consecutive bands of user data storage tracks, such as in Guard Track A and Guard Track E. In any event, in some embodiments a system sector in one of the guard bands includes executable instructions that inform the operating system of the whereabouts of the system sectors in the other guard band.

Ultimately, illustrative embodiments contemplate a data storage device such as but not limited to device 205 in FIG. 2 that has a storage medium 100 containing a plurality of different storage locations for storing user data. The storage locations include a minimum designated storage location, such as the innermost user data storage track 137 (FIG. 1), the least LBA, or the like. The storage locations likewise include a maximum storage location, such as the outermost user data storage track 139, the greatest LBA, or the like. The minimum and maximum storage locations define the extremities of a user data storage space continuum on the storage medium.

The claimed embodiments further contemplate a means for optimizing a utilization of the storage medium 100 by storing system sectors 912 to storage locations within the user data storage space continuum. For purposes of this description and meaning of the appended claims, "means for optimizing" includes the structure disclosed herein and the structural equivalents thereof that permit the storage and retrieval of system sectors within data storage tracks that are bounded on both sides by user data storage tracks. "Means for optimizing" expressly does not include prior attempted solutions whereby the system sectors are otherwise stored in tracks outside the extremities of the user data storage space continuum, such as in a band of tracks at an innermost diameter or an outermost diameter of the medium 100 that are reserved for system sectors and not utilized for storing user data.

FIG. 10 is a flowchart depicting steps in a method 1000 for a power-on-reset routine in accordance with embodiments of the claimed invention. The method 11000 can be implemented by the data storage device 205 executing a series of programming instructions stored in memory.

The method 1000 begins with load operation 1002 in which the RSM is loaded. Again, the RSM is a table or map that informs the operating system as to the location of all the files in a reserved zone. Control then passes to block 1004 in which the system sectors 912 are loaded. Again, the system sectors 912 contain the information that is necessary to the device controller in order to process data access commands in the normal course of transactions. The system sectors 912 can contain information such as channel parameters, zone boundaries and associated zone information such as frequency with which the data is stored, drive configurations, register values, and the like.

After the system sectors are loaded, a number of additional load operations can take place. For example, in load operation 1006 a defect table is loaded. The defect table defines the locations of defects in the medium 100 that were identified during certification testing of the medium 100. The defect table is system data that is well suited for being stored in the system sectors 912.

In load operation 1008 a defect logical zone table is loaded. The defect logical zone table is basically a conversion of the defect locations from a cylinder-head-sector (CHS) format into logical block addressing (LBA) format. The defect logical zone table is system data that is also well suited for being stored in the system sectors 912.

In block 1010 the main overlays are loaded. The entire firmware includes several overlays (or files), the main overlay containing all the codes that are fundamentally important to drive functionality. Finally, in block 1012 RAM code is loaded which completes the code necessary for functionality but not included in the main overlays. The data storage device thus stands ready to process data access commands with a host device.

The present embodiments therefore include unexpected and novel advantages as detailed herein and as can be further appreciated from the claims, figures, and description by those skilled in the art. Although some of the embodiments are described in reference to a data storage medium or a data storage system, or to even more particular embodiments such as a disc or a disc drive, the claimed invention has various other embodiments with application to other data storage technologies.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present embodiments, to the full extent indicated by the broad, general meaning of the terms in which the appended claims are expressed. It will be appreciated by those skilled in the art that the teachings of the present embodiments can be applied to a family of systems, devices, and means encompassed by and equivalent to the examples of embodiments described, without departing from the scope and spirit of the claimed embodiments. Further, still other applications for various embodiments, including embodiments pertaining to data storage media and data storage systems, are comprised within the claimed embodiments.

What is claimed is:

1. A storage medium apparatus comprising:
   a first band of a plurality of consecutive data storage tracks having user data stored thereto;
   a second band of a plurality of consecutive data storage tracks having other user data stored thereto; and
   a guard track medially disposed therebetween the first band and the second band and having system data stored thereto.

2. The apparatus of claim 1 wherein the system data comprises boot sectors.

3. The apparatus of claim 1 wherein user data in the first and second bands and system data in the guard track form a continuous non-servo data field extending radially from an innermost data storage track of the first band to an outermost data storage track of the second band.

4. The apparatus of claim 1 wherein the user data in the first band are stored with a first frequency and the user data in the second band are stored with a second frequency.

5. The apparatus of claim 1 wherein at least one of the first and second bands is characterized by overlapping consecutive data storage tracks.

6. The apparatus of claim 1 wherein within the guard track some servo data is stored that is associated with the first band and other servo data is stored that is associated with the second band.

7. The apparatus of claim 1 wherein servo data is stored in both the first band and the second band, further comprising a guard band of a plurality of consecutive guard tracks, wherein an innermost guard track is consecutive with an outermost data storage track in the first band and an outermost guard track is consecutive with an innermost data storage track in the second band, and wherein some servo data are stored in the guard band that is associated with the first band and other servo data are stored in the guard band is associated with the second band.

8. The apparatus of claim 7 wherein two or more of the guard tracks have the system data stored therein.

9. The apparatus of claim 8 wherein all of the guard tracks have the system data stored therein.

10. The apparatus of claim 7 wherein sets of servo data form a radially extensive servo field, and wherein within the guard band servo fields associated with the first band are radially aligned with respective servo fields associated with the second band.

11. The apparatus of claim 7 wherein sets of servo data form a radially extensive servo field, and wherein within the guard band servo fields associated with the first band are radially offset with respective servo fields associated with the second band.

12. The apparatus of claim 7 comprising a second guard band of a plurality of consecutive guard tracks, wherein one of the guard tracks in the second guard band is consecutive with a data storage track in one of the first and second bands, another of the guard tracks in the second guard band is consecutive with a data storage track in a third band of a plurality of consecutive data storage tracks, and wherein the system data are stored in both bands of guard tracks.

13. The apparatus of claim 12 wherein system data in one of the guard bands comprises executable instructions for identifying system data in the other guard band.

14. The apparatus of claim 7 comprising a second guard band of a plurality of consecutive guard tracks, wherein an innermost guard track in the second guard band is consecutive with an outermost data storage track of a third band of consecutive data storage tracks and an outermost guard track in the second guard band is consecutive with an innermost data storage track of a fourth band of consecutive data storage tracks, wherein neither of the first or second bands of consecutive data storage tracks have a data storage track that is consecutive with a data storage track in the third or fourth bands of consecutive data storage tracks, and wherein the system data are stored in both bands of guard tracks.

15. The apparatus of claim 14 wherein system data in one of the guard bands comprises executable instructions for identifying system data in the other guard band.

16. A method for processing data comprising retrieving system data from an annular guard band of one or more storage tracks interposed between and consecutive with a first band of a plurality of consecutive data storage tracks having user data stored thereto and a second band of a plurality of consecutive data storage tracks having user data stored thereto.

17. The method of claim 16 wherein the retrieving step is characterized by executing an operational sequence that retrieves a first portion of system data from the guard band at a first radial location and that retrieves a second portion of system data from a second guard band at a second radial location having one or more storage tracks interposed between and consecutive with one of the first and second bands of consecutive data storage tracks and a third band of a plurality of consecutive data storage tracks.

18. The method of claim 17 wherein the operational sequence is characterized as a boot sequence.

19. The method of claim 16 wherein the retrieving step is characterized by executing an operational sequence that retrieves a first portion of system data from the guard band at a first radial location and that retrieves a second portion of system data from a second guard band at a second radial location having one or more storage tracks interposed between third and fourth bands of consecutive data storage tracks, wherein neither of the first or second bands of consecutive data storage tracks have a data storage track that is consecutive with a data storage track in the third or fourth bands of consecutive data storage tracks.

20. A storage medium apparatus comprising:
a first band of consecutive data storage tracks having a first plurality of spaced-apart servo sectors in respective servo data fields and a first plurality of user data sectors in respective non-servo data fields between adjacent servo data fields;
a second band of consecutive data storage tracks having a second plurality of spaced-apart servo sectors in the respective servo data fields and a second plurality of user data sectors in the respective non-servo data fields; and
a guard track between the first band and the second band and having a third plurality of servo sectors in the respective servo data fields and system data sectors in the respective non-servo data fields.

21. A storage medium apparatus comprising:
a first band of a plurality of consecutive data storage tracks having user data and servo data stored thereto;
a second band of a plurality of consecutive data storage tracks having user data and servo data stored thereto; and
a guard band of a plurality of consecutive guard tracks between the first band and the second band and having boot sectors stored thereto.

22. A storage medium apparatus comprising:
a first band of a plurality of consecutive data storage tracks having servo data and user data stored thereto;
a second band of a plurality of consecutive data storage tracks having other servo data and other user data stored thereto;
a first guard band of a plurality of consecutive guard tracks having system data stored thereto, wherein an innermost guard track in the first guard band is consecutive with an outermost data storage track in the first band and an outermost guard track in the first guard band is consecutive with an innermost data storage track in the second band, and wherein some of the servo data stored in the first guard band is associated with the first band and other of the servo data stored in the first guard band is associated with the second band; and
a second guard band of a plurality of consecutive guard tracks having system data stored thereto including executable instructions identifying the system data in the first guard band, wherein one of the guard tracks in the second guard band is consecutive with a data storage track in one of the first and second bands, and another of the guard tracks in the second guard band is consecutive with a data storage track in a third band of a plurality of consecutive data storage tracks.

23. A method for processing data comprising retrieving system data from a non-servo data field in an annular guard band of one or more storage tracks interposed between and consecutive with a first band of a plurality of consecutive data storage tracks having user data stored thereto and a second band of a plurality of consecutive data storage tracks having user data stored thereto.

* * * * *